Figure 1:
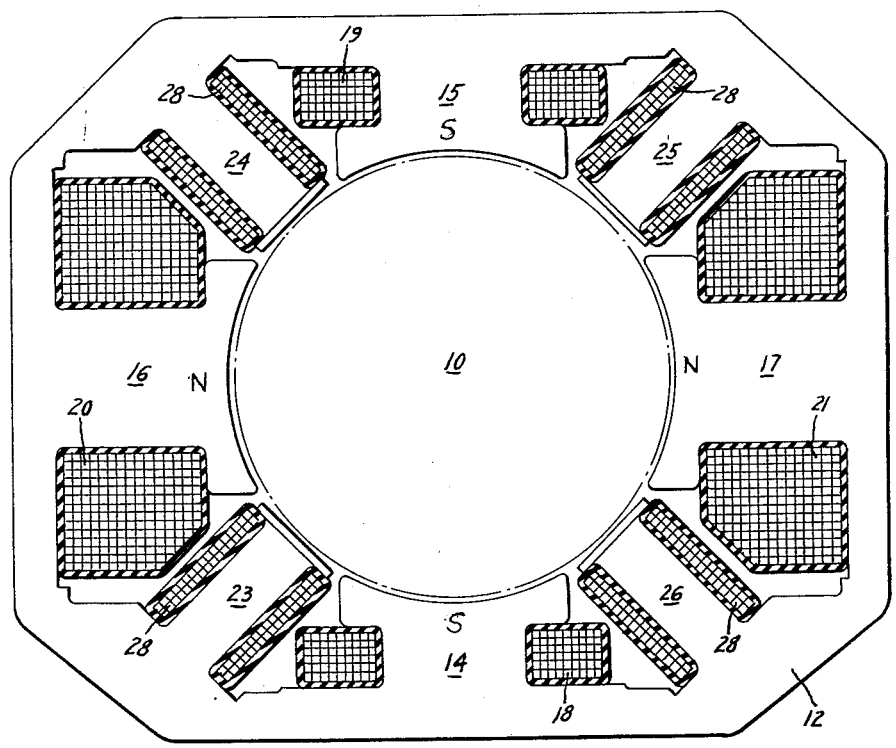

Jan. 8, 1957  M. W. KITZMILLER  2,777,080
DYNAMOELECTRIC MACHINE
Filed June 22, 1955

Inventor:
Mendel W. Kitzmiller,
by
His Attorney.

United States Patent Office 2,777,080
Patented Jan. 8, 1957

2,777,080

DYNAMOELECTRIC MACHINE

Mendel W. Kitzmiller, Erie, Pa., assignor to General Electric Company, a corporation of New York Application June 22, 1955, Serial No. 517,334

7 Claims. (Cl. 310—185)

My invention relates to dynamoelectric machines and more particularly to an improved excitation system for such machines adapted to provide series excitation on alternate main poles and shunt excitation on the remaining poles.

In many applications such as in mining equipment, it is desirable to provide a compound dynamoelectric machine which is generally rectangular or oval in transverse cross section rather than square or round, thus taking advantage of greater space availability horizontally to build a motor having a greater capacity. This allows the mining equipment to be flatter so that it can be readily moved in shallow tunnels. Attempts to provide such a machine in the past have resulted in peculiarly shaped and expensive main pole construction, often with unequal windings and the omission of some of the commutating poles, with a resulting peculiar flux pattern which often tends to impair commutation.

Attempts to provide unequal pole excitation windings on the main poles of a dynamoelectric machine have been generally unsatisfactory because of the unsymmetrical flux pattern of the main poles which fringes into the commutating zones. This usually occurs during overloads which, because of the increased current density between brushes and commutator, results in the severest arcing at the commutating brush. Machines designed with unequal excitation on alternate poles, in order to achieve similar objectives of reduced transverse dimension in one direction, have gone so far as to concentrate all the excitation on two opposite poles (in a four-pole machine) with coils of like polarity, with the intermediate poles remaining unexcited but assuming opposite polarity as the magnetic flux seeks a return path. Such unexcited poles are sometimes referred to as "consequent" poles. In these cases, when a portion or all of the excitation comes from coils connected in series with the armature, the unbalance of the pole excitations becomes greater as the load increases and this greater unbalance has detrimental effects on commutation at the very time when the commutation duty is most severe.

Therefore, an object of my invention is to provide a dynamoelectric machine having transverse axes of different dimensions that overcomes the problems set forth above.

In carrying out my invention in one form, I have provided a dynamoelectric machine with a stationary member having a greater transverse width on one axis than on another transverse axis. Main pole pieces are secured on these axes with the pole pieces on the longer axis being proportionally longer than the other pole pieces. In order to provide a balanced field in the machine at a predetermined loading, shunt field windings having a relatively large number of turns are placed on the longer pair of pole pieces and series field windings having fewer turns are placed on the shorter pole pieces.

Further objects and advantages of my invention will become apparent and my invention will be better understood from the following description, with reference to the accompanying drawing, and features of novelty which characterize my invention will be pointed out with particularity in the claims annexed to and forming part of this specification.

Figure 2:
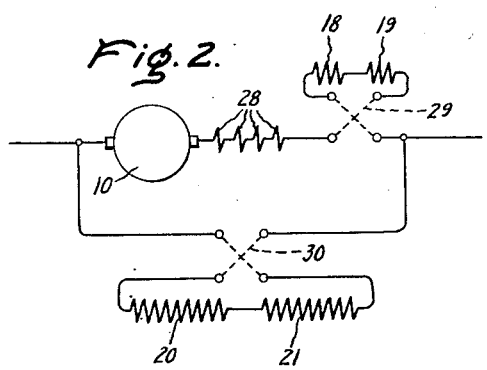

In the drawing, Figure 1 is a schematic sectional end view of a dynamoelectric machine provided with an embodiment of my improved field excitation system; and Figure 2 is a schematic diagram showing a preferred connection arrangement of the windings of the dynamoelectric machine.

Referring to the drawing, I have shown an embodiment of my invention applied to a direct current compound dynamoelectric machine providing a rotatable member or armature 10 having suitable windings thereon. The magnetic excitation path of the machine shown in Figure 1 is provided by a stationary member including a main magnetic frame or stator 12 with main pole pieces 14, 15, 16 and 17 about which the main field windings are arranged to provide excitation flux therein. In order to provide a flattened machine in which the vertical and horizontal transverse axes may be of different dimensions, the pole pieces 14 and 15 are shorter than the pole pieces 16 and 17.

In the dynamoelectric machine of my invention, alternate main pole pieces are of opposite polarity with respect to the rotatable member 10. Thus, in the construction I have shown, the pole pieces 16 and 17 are north poles and the shorter main pole pieces 14 and 15 are south poles with respect to the rotatable member 10. I prefer that the cross-sectional area of the bodies of each of the pole pieces 14 and 15 be substantially the same as that of the bodies of the pole pieces 16 and 17, and that both pairs of main poles have a symmetrical area axially with the axes thereof being radial with respect to the armature 10 and perpendicular with respect to the frame 12. This symmetric construction of the bodies of the pole pieces reduces the manufacturing costs and provides an efficient thermal conductivity for cooling the machine.

In order to provide a symmetric flux path, the shoes of the main pole pieces are each of similar construction. The leading and trailing pole tips are identical so that the machine may be reversible.

Many compound dynamoelectric machine applications, particularly in mining equipment where overloads are relatively common, require field windings with approximately 30% series ampere turns excitation and 70% shunt ampere turns excitation at the rated load. Because the larger conductor necessary to carry the series current of the series field winding and the fact that the large wires require no thicker insulation than the smaller shunt field winding wires, the series winding has a better space factor, requiring less insulation per square inch of the series field winding, which results in a better temperature gradient and allows the external or cooling surfaces to be decreased. In view of the reduced ampere turns required, better temperature gradient, and the fact that the series field current is much greater than the shunt field current allowing fewer turns in the series windings, the cross-sectional area of the winding space for the series field windings is much less than that required for shunt field windings.

In order to take advantage of these reduced sizes of the series field windings in my invention, I place only the main series field excitation windings 18 and 19 on the shorter pole pieces 14 and 15, and only the main shunt field excitation windings 20 and 21 on the longer pole pieces 16 and 17. Thus, the main poles 14 and 15 are made as short as practicable and the vertical transverse axis of the machine is minimized.

In order to improve the commutation characteristic of the machine, I prefer to use a full complement of four commutation pole pieces 23, 24, 25 and 26 arranged intermediate to the main pole pieces of the machine to be excited by the series commutating field windings 28. This arrangement allows a balanced and positive control of the flux pattern at each of the brushes.

In Figure 2, I have shown a preferred connection of the windings of the dynamoelectric machine shown in Figure 1. The series field excitation windings 18 and 19 are connected through a conventional reversing switch 29, and all of the commutation windings 28 are connected in series circuit relationship with the armature 10. The shunt field windings 20 and 21 are shown as being connected by the reversing switch 30 across this series circuit. It will be understood, however, that the shunt field windings 20 and 21 may be separately excited from an independent source.

When the application of the particular mining motor requires approximately a 2-to-1 ratio between the shunt and series main excitation fields, the excitation of the main poles with my invention approaches equality at 100% overload, thereby eliminating any adverse effects of unequal excitation on commutation when the machine is overloaded. It is under this condition that good commutation is most difficult to obtain in normal machines. Therefore, I prefer to have the main pole excitation produced by the shunt and series windings equal at approximately 100% overload or 200% full load.

It should be noted that if the series field windings were designed to be large enough to balance the shunt winding excitation at full load, the recurring overloading of the motor would impair commutation where current densities are greatest and arcing is most damaging, while my arrangement improves commutation until 100% overload is reached. As 100% overload is not usually exceeded for long periods of time, any impairment of commutation above that point will not greatly affect the running life of the brushes or commutator. Also, the unbalance in the main pole excitation at less than 100% overload does not impair satisfactory commutation, because at reduced armature current density, the commutation requirements are less severe. At no load, for example, the unbalance is most extreme because only the shunt field windings 20 and 21 are excited, but at the same time there is no load current to be reversed in the armature windings. Thus, there can be no arcing between the brushes and the commutator at no load.

As the series current increases, the damaging effect of an arc would increase, but the likelihood of any arc would decrease because the excitation approaches balance. My arrangement gives satisfactory commutation at all loads with a full complement of commutation pole pieces and windings. Thus, my construction provides a field excitation arrangement as desirable as that in any round dynamoelectric machine. Yet the frame has a minimum height while providing a full complement of commutating windings.

This invention is particularly useful in mining and other power applications where space is at a premium and short period overloads are relatively common.

While I have illustrated and described a particular embodiment of my invention, modifications thereof will occur to those skilled in the art. I desire it to be understood, therefore, that my invention is not limited to the particular arrangement disclosed, and I intend by the appended claims to cover all such modifications which do not depart from the true spirit and scope of my invention.

What I claim as new and desired to cover by Letters Patent of the United States is:

1. A dynamoelectric machine having a rotatable member and a stationary member, said stationary member having a greater transverse width on one axis than on another transverse axis, main pole pieces for said stationary member, a first pair of said main pole pieces being arranged on said one axis, a second pair of said main pole pieces being shorter than said first pair and arranged on said other axis, shunt field windings mounted on said first pair of main pole pieces, and series field windings mounted on said second pair of main pole windings, said windings being connected so that said first pair of pole pieces has a magnetic polarity with respect to said rotatable member opposite that of said second pair of pole pieces.

2. A dynamoelectric machine having a rotatable member and a stationary member, said stationary member having a greater transverse width on one axis than on another transverse axis, main pole pieces for said stationary member, a first pair of said main pole pieces being arranged on said one axis, a second pair of said main pole pieces being shorter than said first pair and arranged on said other axis, shunt field windings only mounted on said first pair of main pole pieces, and series field windings only mounted on said second pair of main pole windings, said windings being connected so that said first pair of pole pieces has a magnetic polarity with respect to said rotatable member opposite that of said second pair of pole pieces.

3. A compound dynamoelectric machine having a rotatable member and a stationary member, an armature winding on said rotatable member, said stationary member having a greater transverse width on one axis than on another transverse axis, main pole pieces for said stationary member, a first pair of said main pole pieces being arranged on said one axis, a second pair of said main pole pieces being shorter than said first pair and arranged on said other axis, shunt field windings mounted on said first pair of main pole pieces, and series field windings mounted on said second pair of main pole windings, said windings being connected so that said first pair of pole pieces has a magnetic polarity with respect to said rotatable member opposite that of said second pair of pole pieces, said series field windings as compared to said shunt field having an ampere-turns ratio to provide flux in a ratio of 1:2 at rated load when said series field windings are connected in series relation with said armature winding, and said shunt windings are connected in parallel therewith.

4. A dynamoelectric machine having a rotatable member and a stationary member, said stationary member having a greater transverse width on one axis than on another transverse axis, main pole pieces for said stationary member, said pole pieces being of substantially the same cross-sectional area, a first pair of said main pole pieces being arranged on said one axis, a second pair of said main pole pieces being shorter than said first pair and arranged on said other axis, shunt field windings mounted on said first pair of main pole pieces, series field windings mounted on said second pair of main pole windings, said windings being connected so that said first pair of pole pieces has a magnetic polarity with respect to said rotatable member opposite that of said second pair of pole pieces, and commutating pole pieces arranged intermediate to said main pole pieces.

5. A compound dynamoelectric machine having a rotatable member and a stationary member, said stationary member having a greater transverse width on one axis than on another transverse axis, main pole pieces for said stationary member, said pole pieces being of substantially the same cross-sectional area, a first pair of said main pole pieces being arranged on said one axis, a second pair of said main pole pieces being shorter than said first pair and arranged on said other axis, shunt field excitation windings mounted on said first pair of main pole pieces, series field excitation windings mounted on said second pair of main pole windings, said windings being connected so that said first pair of pole pieces has a magnetic polarity with respect to said rotatable member opposite that of said second pair of pole pieces, commutating pole pieces arranged intermediate to said main pole pieces, and series commutating windings mounted on said commutating pole pieces.

6. A four-pole dynamoelectric machine having a rotatable member and a stationary member, said stationary member having a greater transverse width on one axis than on another transverse axis, main pole pieces for said stationary member with alternate main pole pieces being of different length, a first pair of said main pole pieces being arranged on said one axis, a second pair of said main pole pieces being shorter than said first pair and arranged on said other axis, shunt field windings mounted on said first pair of main pole pieces, series field windings mounted on said second pair of main pole windings, the turns ratio of said windings being such that at 100% overload, the excitation by said series and said shunt windings is substantially equal, said windings being connected so that said first pair of pole pieces has a magnetic polarity with respect to said rotatable member opposite that of said second pair of pole pieces, and commutating pole pieces arranged intermediate to said main pole pieces.

7. A four-pole compound dynamoelectric machine having a rotatable member and a stationary member, an armature winding mounted on said rotatable member, said stationary member having a greater transverse width on one axis than on another transverse axis, main pole pieces for said stationary member with alternate main pole pieces being of different length, said pole pieces being symmetrical and being mounted on perpendicular transverse axis of said stationary member, a first pair of said main pole pieces being arranged on said one axis, a second pair of said main pole pieces being shorter than said first pair and arranged on said other axis, shunt field excitation windings mounted on said first pair of main pole pieces, series field excitation windings mounted on said second pair of main pole windings, said windings being connected so that said first pair of pole pieces has a magnetic polarity with respect to said rotatable member opposite that of said second pair of pole pieces, commutating pole pieces arranged intermediate to said main pole pieces, and series commutating windings mounted on said commutating pole pieces, said armature winding, said series field windings and said series commutating windings being connected to form a series circuit, said shunt field windings being connected across said series circuit, and the turns ratio of said series and said shunt field windings being such that at 100% overload, the excitation by said series and shunt windings is substantially equal.

References Cited in the file of this patent

FOREIGN PATENTS

| | | |
|---|---|---|
| 380,389 | Great Britain | Sept. 15, 1932 |
| 32,669 | France | Oct. 4, 1927 |
| | (Addition to No. 628,293) | |